United States Patent [19]

Nelkin et al.

[11] 4,114,063
[45] Sep. 12, 1978

[54] PIEZOELECTRIC SEDIMENT PARTICLE TRANSPORT DETECTOR

[75] Inventors: Arthur Nelkin, Annapolis; Dale D. Skinner, Severna Park; Donald G. Wilson, Severna Park; Harold D. Palmer, Severna Park, all of Md.

[73] Assignee: Westinghouse Electric Corp., Pittsburgh, Pa.

[21] Appl. No.: 791,434

[22] Filed: Apr. 27, 1977

[51] Int. Cl.² .......................................... H01L 41/10
[52] U.S. Cl. .................................. 310/334; 310/328; 310/319; 310/321; 73/194 A; 73/587
[58] Field of Search .............. 310/312, 319, 321, 323, 310/324, 328, 334, 337, 338, 329; 340/236, 261, 239, 421, 8 R, 10, 17; 181/401; 73/194 A, 194 B, 194 C, 194 M, 188, 228, 552, 70, 53, 59, 61 R, 432 R, DIG. 1, DIG. 4

[56] References Cited

U.S. PATENT DOCUMENTS

| 2,746,291 | 5/1956 | Swengel | 310/334 X |
| 3,034,001 | 5/1962 | King | 310/329 |
| 3,218,852 | 11/1965 | Scarpa et al. | 73/194 B |
| 3,391,571 | 7/1968 | Johanson | 310/368 X |
| 3,517,316 | 6/1970 | Anderson et al. | 340/261 X |
| 3,557,616 | 1/1971 | Landon, Jr. et al. | 340/239 R X |
| 3,693,438 | 9/1972 | Yamasaki et al. | 73/194 VS |
| 3,816,773 | 6/1974 | Baldwin et al. | 310/338 X |
| 3,908,454 | 9/1975 | Mullins et al. | 310/338 UX |
| 4,013,905 | 3/1977 | Breneman et al. | 310/336 |

*Primary Examiner*—Mark O. Budd
*Attorney, Agent, or Firm*—D. Schron

[57] ABSTRACT

A sand transport detector which detects the discrete impingements of sand particles on an elongated probe member inserted into the sand. A piezoelectric transducer element is cemented to the probe and produces an output signal when impingement occurs. With an electronic circuit coupled to the transducer, an indication of sand transport may be obtained.

8 Claims, 6 Drawing Figures

PIEZOELECTRIC SEDIMENT PARTICLE TRANSPORT DETECTOR

BACKGROUND OF THE INVENTION

1. Field of the Invention

The invention in general relates to an environmental monitoring system, and particularly to a system for detecting movement of sand, or the like.

2. Description of the Prior Art

Ocean waves and tides greatly influence the topography of near shore areas by causing movement of rocks and sand. This sand transport is of interest not only to marine scientists but to the Coast Guard and Corps of Engineers since changes in bottom profile can have an adverse effect on shipping channels and harbors.

Studies of sand transport need some method of telling when and where sand is being moved. Presently this transport is measured by direct visual observation, radioactive or fluorescent tracers, with photography, or is estimated from multiple bathymetric measurements.

Visual observations result in real time information however such observations cannot be made when the water is turbid. Bathymetric measurements although operable in turbid water do not provide real time data whereas tracers require government licensing and stringent controls and monitoring during use.

The present invention provides a much needed detector for study of sand transport and is capable of providing real time data in turbid waters, with the additional advantage of being relatively uncomplicated and inexpensive.

SUMMARY OF THE INVENTION

The detector system of the present invention measures sediment particle movement, such as sand transport and includes an elongated probe member made of a material which will support acoustic propagation. This probe member is positioned in the path of expected sand transport and includes a transducer coupled to it so as to provide an output signal when the sand particles impinge upon the probe member with each impingement causing an acoustic emission.

Circuit means are connected to receive the output signal from the transducer to provide an indication of the impingement with the indication being indicative of the sand transport past the probe.

For use in air the probe member may have a smooth surface, such as a pipe or rod whereas for underwater use the probe member preferably has an irregularly shaped surface so as to create a turbulent boundary layer to enhance impact frequency.

DESCRIPTION OF THE PREFERRED EMBODIMENT

Although the present invention is applicable to various sediment particle transport, it will be described by way of example with respect to detection of sand transport.

Figure 1:
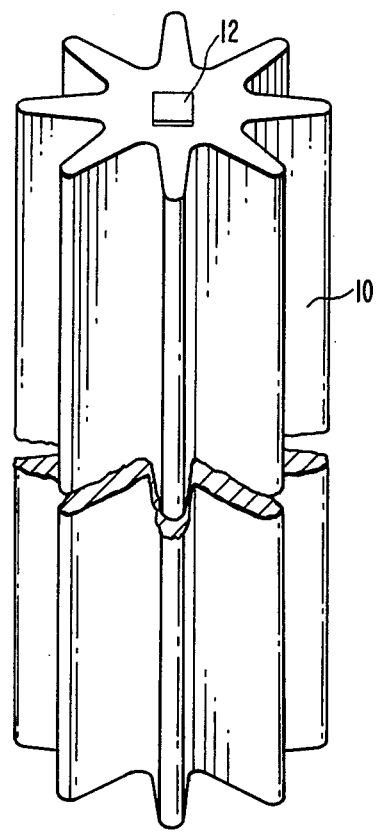
FIG. 1 is a perspective view and FIG. 1A is a side view of one embodiment of the present invention.
Figure 1A:
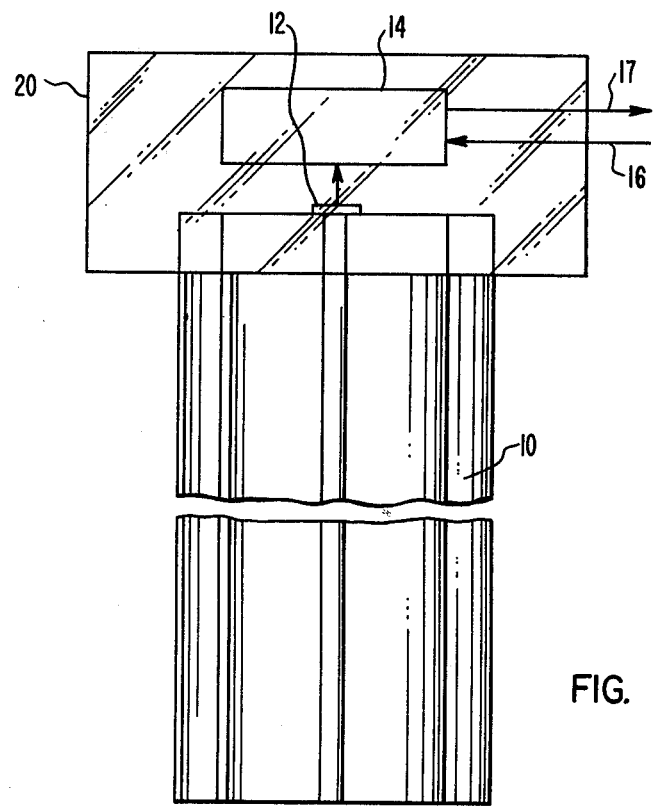

In FIGS. 1 and 1A there is illustrated a probe member 10 made out of a material which will support acoustic propagation and which has a low loss to such propagation, a typical example being 6061-T6 aluminum. For underwater use, this material has reasonable resistance to corrosion.

In use, the probe member is jetted into the granular bottom such that its lower half is buried while its upper half is exposed to the water medium. With sand being moved by water currents, the probe member can be buried deeper, or uncovered by the sand transport process and a reasonable choice of probe member length will permit considerable erosion to take place before the probe must be repositioned. This is an important consideration if the probe is to be left in place for considerable lengths of time. A typical length probe may be in the order of 2 meters while the width of the probe may be approximately 5.08 centimeters.

Since there is a relatively small difference in density between the water and sand particles, and since the impact of sand particles are to be detected, it is important that the sand not be carried along by the water around the probe. Accordingly, probe member 10 for underwater use has an irregular surface shape that breaks up the laminar flow around the probe. The resulting turbulent boundary layer greatly increases the probability of sand particle impingements. The irregularly shaped surface illustrated is by way of example star shaped, and in actual tests the probe member was constructed from finned aluminum extrusion normally sold as heat sink material for semiconductors.

Transducer means such as piezoelectric transducer 12 is coupled to the probe and is operable to provide an output signal in response to impingement of the sand particles. It has been found that the impact noises can be transmitted considerable distances through metals and be detected by a conventional piezoelectric transducer. A satisfactory transducer may be in the form of a poled and plated flat slab of piezoceramic cemented to the end of the probe and having approximate dimensions of 0.635 centimeters × 0.635 centimeters × 0.058 centimeters thick.

Circuit means are provided to be responsive to the output signal of the transducer so as to provide an indication of the impingements with the indication being indicative of the sand transport past the probe member. The electronic circuit package 14 is illustrated in FIG. 1A and includes an input line 16 for receiving operating potential from a remote source and an output line 17 for providing information signals to a utilization means.

The upper part of probe member 10 including the transducer 12 and electronic circuit package 14 may be encapsulated in a suitable potting material 20, polyurethane being one example. By placing the electronic circuitry relatively close to the transducer, lead lengths and possible interference problems are minimized.

Figure 2:
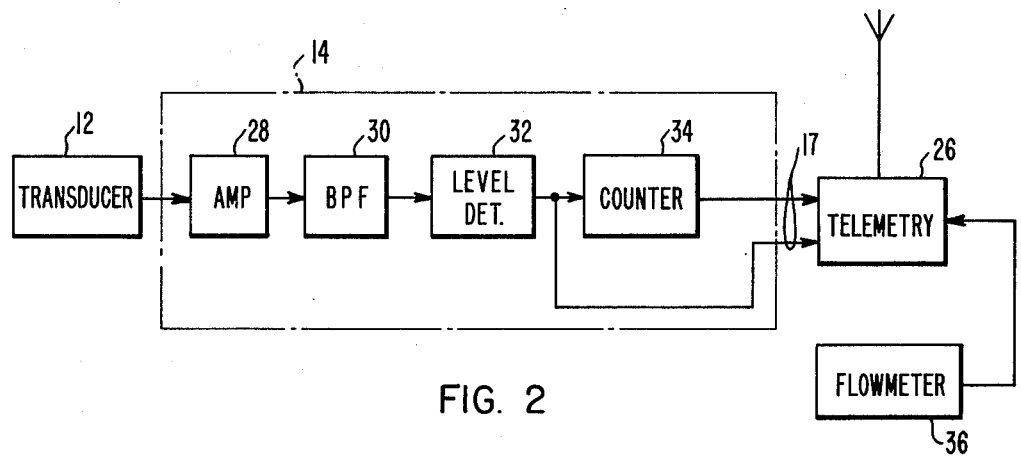
FIG. 2 is a block diagram of electronic circuitry for the present invention.

For underwater use, the transducer output signal processed by electronic circuitry may be recorded such as on tape and then recovered by diving operations. As another alternative the electronic signals may be provided to an on-shore station by long lines. FIG. 2 illustrates yet another scheme wherein the signals are provided to a telemetry unit 26 which will transmit the information to a remote receiver. The electronic section includes an amplifier 28 which amplifies the transducer output signal and provides it to a band pass filter 30 which removes extraneous noise signals outside the frequency range of interest, the frequency range typically being from approximately 10 kHz to 1 mHz. A threshold or level detector 32 may be utilized so as to provide an output signal only when the band pass filter provides an output above a predetermined threshold.

The electronic circuitry may be designed to provide two types of outputs, one relating to information as to whether or not sand is being transported at any given instant and the other being related to the number of impingements in a given period of time, this number being roughly proportional to the total amount of sand being swept past the probe. The output of level detector 32 provides the first type of output, that is whether or not sand is being transported at any given instant. To provide the second type of output, the number of impacts, there is provided a counter 34 to count the number of pulses being provided by level detector 32. The two information signals are then provided to telemetry units 26 for transmission.

If it is desired to know the direction in which the sand is being moved, a flow meter unit 36 may additionally be included to give water velocity and direction information which may also be telemetered to the remote receiver station.

Figure 3:
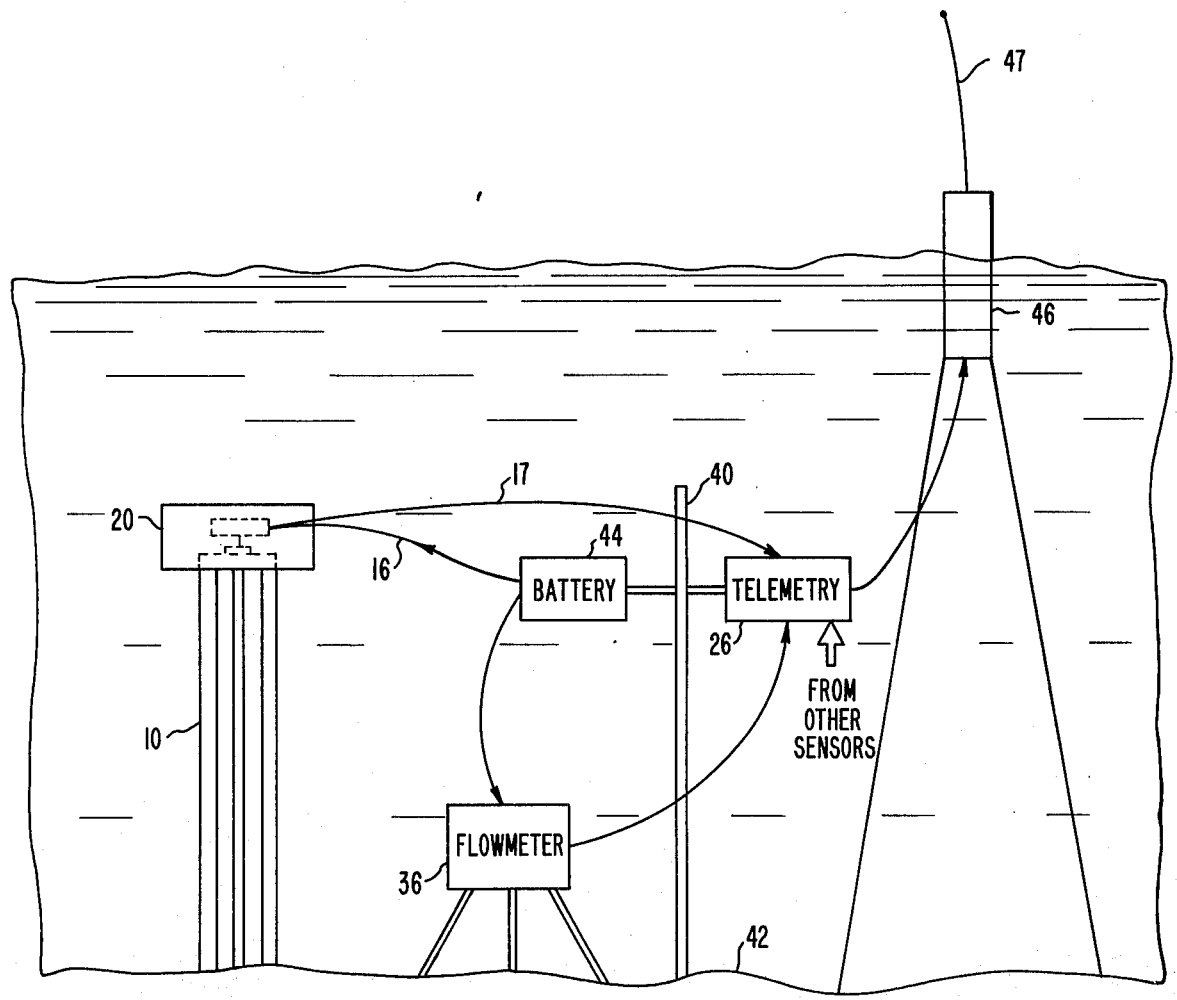
FIG. 3 is an underwater view of the deployment of the present invention.

FIG. 3 shows an in situ arrangement for the apparatus. A mounting post 40 is inserted into the sand bottom 42 and carries the telemetry unit 26 in addition to a power source in the form of battery 44.

The sand transport information as well as the flow meter information is provided to the telemetry unit, which may additionally receive information signals from other deployed sensors, and the telemetry unit is hard wired to a suitably moored surface bouy 46 having a marine whip antenna 47.

The telemetered information may be utilized in a number of ways for sand transport studies. The information from the various sensors including the sand transport detector may be provided to a computer for suitable analysis. If it is just desired to know the net change in sand transport along a certain direction, for example to and from shore, the arrangement of FIG. 4 would be suitable.

Figure 4:
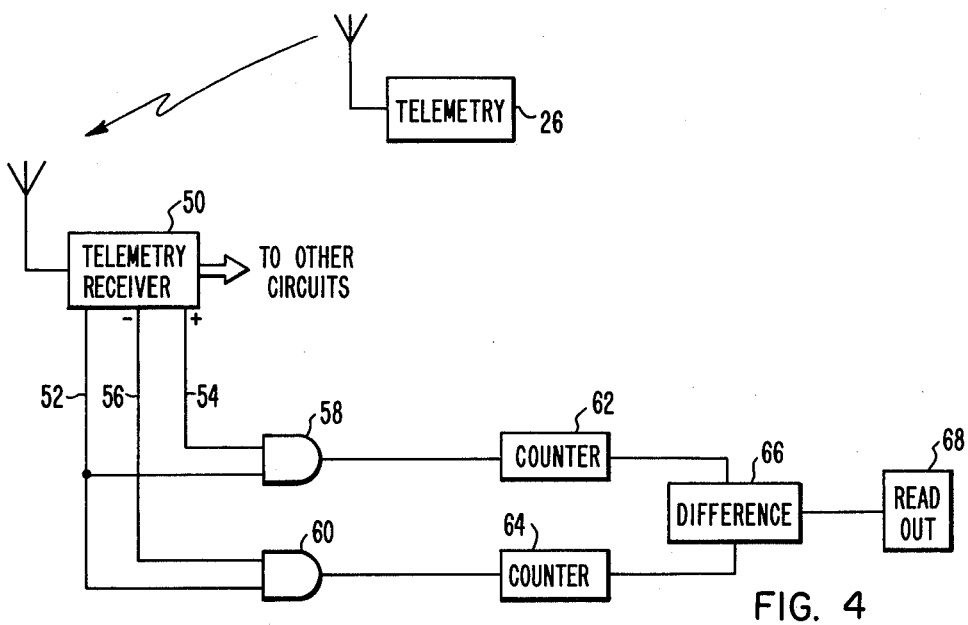
FIG. 4 is a block diagram of receiver circuitry for determining net flow into or out of a region.

The circuitry of FIG. 4 represents the remote receiving station for receiving the telemetered information from telemetry unit 26. A telemetry receiver 50 is provided and includes the circuitry for sorting out the various information signals one of which, on line 52, is an indication of sand transport, such as would be provided by level detector 32 of FIG. 2. A water flow in toward the shore may result in an output on line 54 whereas water flow away from shore will result in an output on line 56.

First and second gating circuits 58 and 60 receive the output signal on line 52 in addition to the respective signals on lines 54 and 56. If there is sand transport toward shore, gate circuit 58 provides the impingement indications to a first counter 62. If the sand transport is in the opposite direction, gate circuit 60 will provide the indication to counter circuit 64. A difference circuit 66 provides an output which is the difference between the counts and counter 62 and 64, and this difference is interpreted by readout circuit 68.

Figure 5:
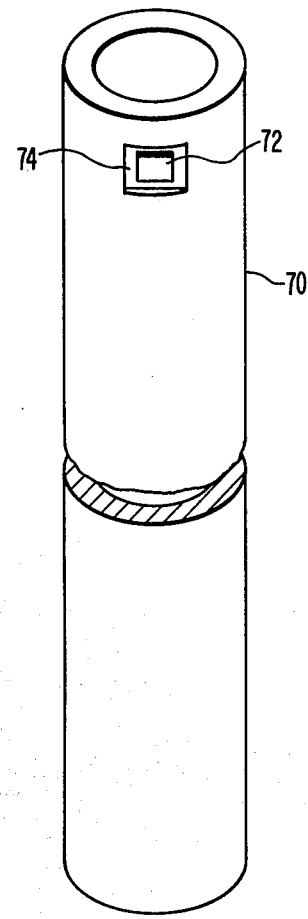
FIG. 5 illustrates an alternate embodiment of the present invention.

The arrangement thus far described is equally applicable for detecting sand transport in an air environment for example to detect sand dune movement or to assist in recreational area maintenance. In the atmospheric case there is a large difference in density between the air and sand so that sand particles are not smoothly carried around the probe body but impinge upon the metal. Accordingly a relatively simple probe member may be provided such as probe member 70 illustrated in FIG. 5. The probe is in the form of a pipe, having similar characteristics to the probe already described with respect to acoustic propagation.

A transducer 72 similar to that already described is coupled to the probe 70 such as by gluing to a previously flattened area 74 on the pipe surface. The signal processing and retrieval of information may be similar to that previously mentioned or described and for environmental protection, the upper end of probe 70 may be encapsulated in a potting material.

What we claim is:

1. A sediment particle movement detector system comprising:
   a. an elongated probe member of a material which will support acoustic propagation, for positioning in the path of expected sediment transport;
   b. transducer means coupled to said probe member and operable to provide an output signal in response to impingement of said particles upon said probe member, each said impingement causing an acoustic emission; and
   c. circuit means connected to receive said output signal of said transducer means for providing an indication of said impingement, said indication being indicative of said sediment transport past said probe member;
   d. the major length of said elongated probe member, which is exposed to said sediment transport having an irregularly shaped surface to break up laminar flow around said probe;
   e. said irregularly shaped surface being so shaped as to increase the impingement of said sediment particles on said probe member.

2. Apparatus according to claim 1 wherein
   a. said probe member includes a plurality of radially extending fin members.

3. Apparatus according to claim 1 wherein
   a. said probe member is made of aluminum.

4. Apparatus according to claim 1 wherein
   a. said transducer means is connected to said probe member at one end thereof.

5. Apparatus according to claim 4 wherein
   a. said circuit means is positioned relatively close to said transducer means, at said one end to minimize transducer lead lengths.

6. Apparatus according to claim 4 wherein
   a. said transducer means and said one end of said probe member are encapsulated in a potting material.

7. Apparatus according to claim 1 wherein said circuit means includes
   a. an amplifier for amplifying the output signal of said transducer means;
   b. a band pass filter for passing output signals only within a certain frequency band; and
   c. a level detector operable to pass only amplified output signals above a predetermined threshold value.

8. Apparatus according to claim 7 which includes
   a. a counter;
   b. said counter being responsive to the signal provided by said level detector to provide an indication of the number of said impingements.

* * * * *